US012135954B2

(12) United States Patent
Lo

(10) Patent No.: US 12,135,954 B2
(45) Date of Patent: Nov. 5, 2024

(54) ACCUMULATION SYSTEMS AND METHODS

(71) Applicants: VeriSilicon Microelectronics (Shanghai) Co., Ltd., Shanghai (CN); VeriSilicon Holdings Co., Ltd., George Town (KY)

(72) Inventor: Mankit Lo, San Jose, CA (US)

(73) Assignees: VeriSilicon Microelectronics (Shanghai) Co., Ltd., Shanghai (CN); VeriSilicon Holdings Co., Ltd., George Town (KY)

( * ) Notice: Subject to any disclaimer, the term of this patent is extended or adjusted under 35 U.S.C. 154(b) by 867 days.

(21) Appl. No.: 17/180,229

(22) Filed: Feb. 19, 2021

(65) Prior Publication Data

US 2022/0269484 A1    Aug. 25, 2022

(51) Int. Cl.
  *G06F 7/509*    (2006.01)
  *G06F 7/544*    (2006.01)
  *G06N 3/063*    (2023.01)

(52) U.S. Cl.
  CPC .......... *G06F 7/5095* (2013.01); *G06F 7/5443* (2013.01); *G06N 3/063* (2013.01)

(58) Field of Classification Search
  CPC .... G06F 7/5095; G06F 7/4991; G06F 7/5443; G06F 1/3237; G06F 1/3275; G06F 1/3287
  See application file for complete search history.

(56) References Cited

U.S. PATENT DOCUMENTS

| | | | |
|---|---|---|---|
| 5,917,741 A * | 6/1999 | Ng | G06F 7/483 708/672 |
| 6,434,588 B1 | 8/2002 | Kim et al. | |
| 10,387,122 B1 * | 8/2019 | Olsen | G06N 3/063 |
| 2010/0153830 A1 * | 6/2010 | Gopal | G06F 7/4991 714/809 |
| 2020/0310758 A1 | 10/2020 | Desoli et al. | |
| 2020/0364577 A1 | 11/2020 | Le Gallo-Bourdeau et al. | |
| 2021/0004208 A1 | 7/2021 | Lai et al. | |

* cited by examiner

*Primary Examiner* — Andrew Caldwell
*Assistant Examiner* — Carlo Waje
(74) *Attorney, Agent, or Firm* — David R. Stevens; Stevens Law Group

(57) ABSTRACT

Example accumulation systems and methods are described. In one implementation, data is received for processing. A multiplication operation is performed on the received data to generate multiplied data. An addition operation is performed on the multiplied data to generate a result. At least a portion of the least significant bits of the result are stored in a first region of an accumulation buffer of a convolution core. And, at least a portion of the remaining bits of the result are stored in a shared memory that is separate from the convolution core.

1 Claim, 5 Drawing Sheets

ACCUMULATION SYSTEMS AND METHODS

TECHNICAL FIELD

The present disclosure relates to systems and methods that perform multiply/accumulate operations.

BACKGROUND

Various types of systems perform multiply and accumulate operations. For example, neural networks and matrix multiplication systems may perform one or more multiply or accumulate operations. These multiply and accumulate operations may be applied to a variety of mathematical problems that lend themselves to computational solutions. Some of these computational solutions may include an accumulation buffer that supports combining multiple groups of data together.

The systems and methods discussed herein provide an improved approach for perform multiply/accumulate operations.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
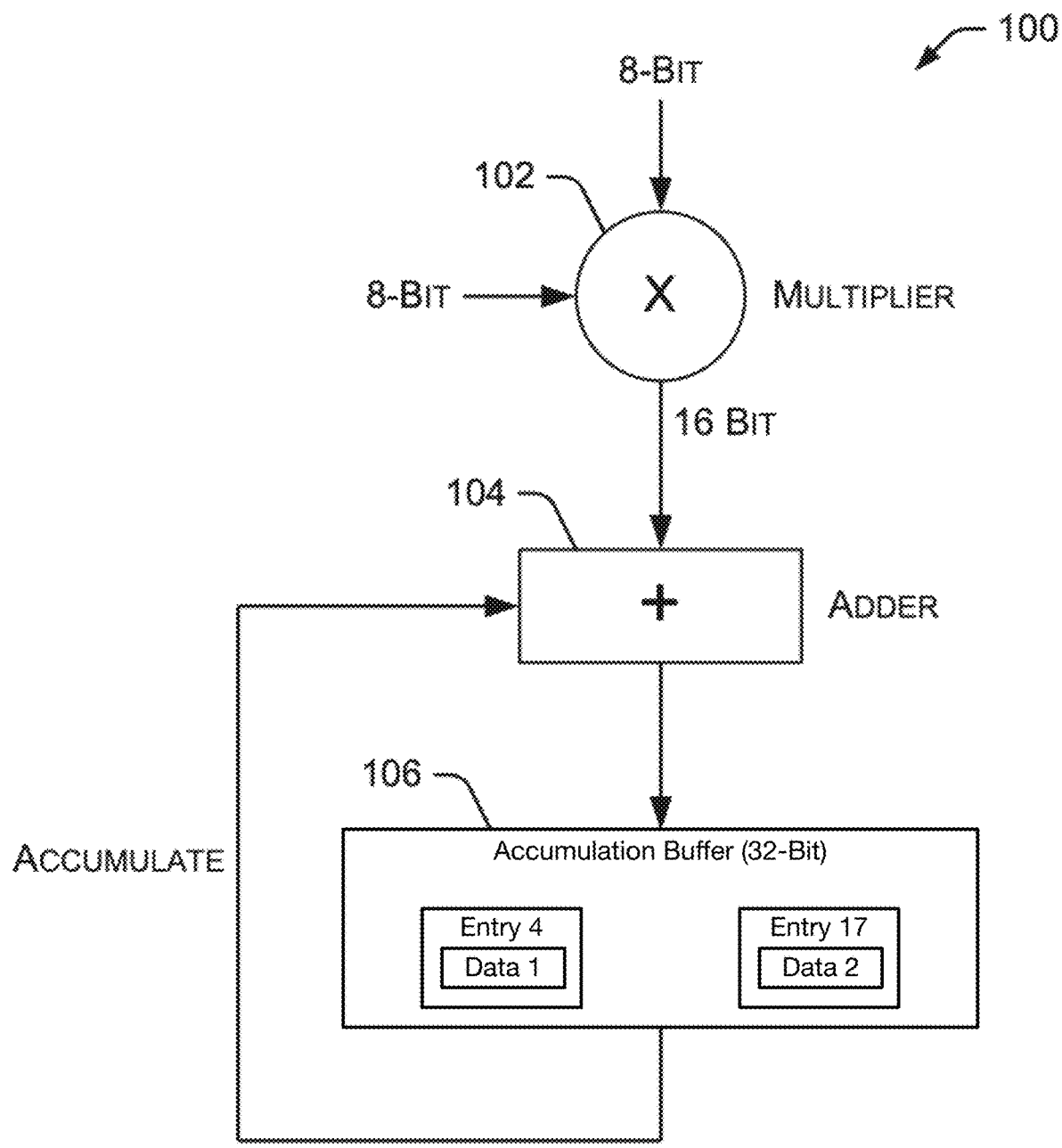
FIG. 1 illustrates an embodiment of a system for performing multiply/accumulate operations.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

At least some embodiments of the disclosure are directed to computer program products comprising such logic (e.g., in the form of software) stored on any computer useable medium. Such software, when executed in one or more data processing devices, causes a device to operate as described herein.

The systems and methods discussed herein are useful in a variety of computing environments and procedures, such as machine learning environments, neural networks, matrix multiplication procedures, and the like. As described herein, the systems and methods may reduce power used by a device (such as a processing device or storage device) and may need less memory storage space during operation of the system.

FIG. 1 illustrates an embodiment of a system 100 for performing multiply/accumulate operations. System 100 may be referred to as a "convolution core" herein. In some embodiments, system 100 can be implemented in any device, system, or environment that requires a long accumulation sequence. In some embodiments, system 100 performs a multiplication operation on two 8-bit numbers (also referred to as "data" herein) using a multiplier 102. The output of multiplier 102 is a 16-bit number, which is communicated to an adder 104. The adder 104 operates with an accumulation buffer 106 as shown in FIG. 1. In some embodiments, accumulation buffer 106 is a 32-bit accumulation buffer.

Accumulation buffer 106 may operate as a buffer and may store multiple data entries for an extended period of time. For example, accumulation buffer 106 may accumulate incoming data up to a particular number of entries, such as 32 entries. In a particular example, data 1 may be stored in entry 4 of accumulation buffer 106, data 2 may be stored in entry 17 of accumulation buffer 106, and so forth. In some embodiments, there is no particular mapping of data to accumulation buffer entries. In particular implementations, the accumulated data is interleaved within accumulation buffer 106. In some embodiments, each entry in accumulation buffer 106 is a channel of a neural network. A particular convolution layer of a neural network may have any number of channels.

In some implementations, a single accumulation buffer 106 can support data associated with any number of channels. This may allow data to be fetched faster because data from multiple channels can be fetched from accumulation buffer 106 simultaneously (instead of a slower, sequential fetching of data). For example, data may be fetched once and stored in accumulation buffer 106. Then, the data can be accessed or applied to multiple channels (from accumulation buffer 106) at the same time (or at different times without requiring the data to be fetched again).

Figure 2:
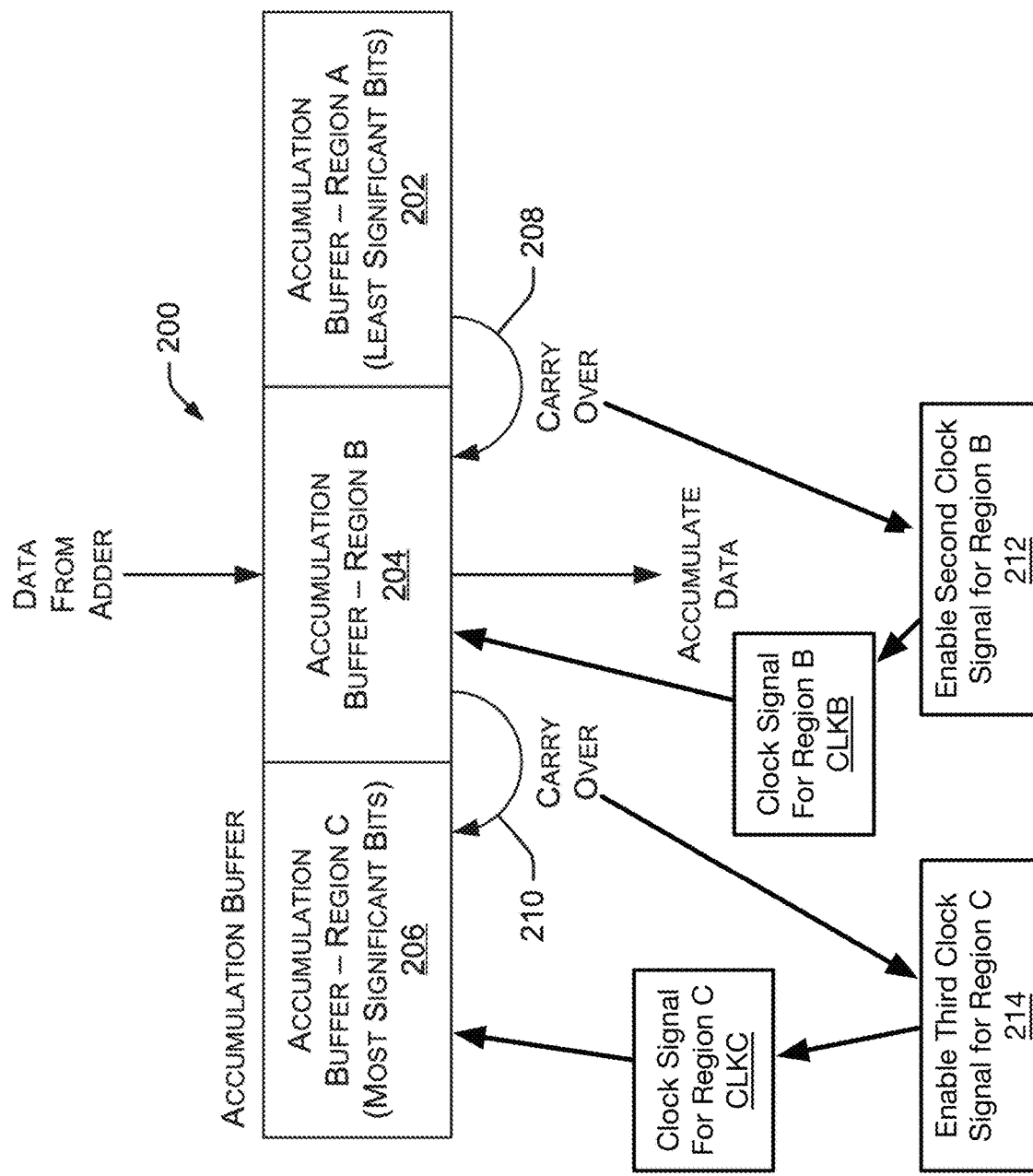
FIG. 2 illustrates an embodiment of an accumulation buffer.

FIG. 2 illustrates an embodiment of an accumulation buffer 200. As shown in FIG. 2, accumulation buffer 200 has three portions which are referred to as "regions". These regions of accumulation buffer 200 include a region A 202, a region B 204, and a region C 206. In some embodiments, each region contains a portion of the bits in a particular entry. For example, if a total of 32 bits are available in accumulation buffer 200, region A 202 may include the least significant 16 bits, region B 204 may include the next most significant 8 bits, and region C 206 contains the most significant 8 bits. In other embodiments, any number of bits may be available in accumulation buffer 200 and any number of bits may be provided in each region. Further, alternate embodiments may separate accumulation buffer 200 into any number of different regions.

In some implementations, it takes a significant number of additions to fill the 32 bit buffer, such as $2^{15}$ additions. In some embodiments, a neural network may not have enough steps or activities to fill the 32 bit buffer (or it takes a long time to fill the 32 bit buffer). In some examples, the buffer starts filling region A 202. When region A 202 is filled, a carry over command 208 (or activity) is generated indicating that data will start being stored in region B 204. Similarly, when region B 204 is filled, a carry over command 210 (or activity) is generated indicating that data will start being stored in region C 206.

Initially, accumulation buffer 200 doesn't need to access region B 204 or region C 206 until region A 202 is filled. In some embodiments, when region B 204 or region C 206 are not utilized, the clock (e.g., clock signal CLKB, CLKC) for each unused region is disabled to reduce power consumption. In some implementations, if there is no data activity, but the clock remains enabled, significant power may be required to generate the unnecessary clock. Thus, disabling the clock saves power when the particular region is not being used.

When region B 204 or region C 206 need to store data (e.g., based on a carry over 208 or 210), the clock for the appropriate region 204, 206 is enabled 212, 214 to allow data activity in that region. For example, if a carry over 208 is detected, the clock for region B 204 is enabled 212 to allow data storage in region B 204. However, the clock for region C 206 remains disabled until a carry over 210 is detected. Thus, the systems and methods described herein may reduce power consumption by disabling the clock for all regions that are not actively handling data.

An apparatus comprises: a first region configured to store data associated with at least a portion of least significant bits of a computational result; a second region configured to store data associated with at least a portion of most significant bits of the computational result; and a third region configured to store data associated with at least a portion of bits of the computational result having a significance between the least significant bits and the most significant bits of the computational result; wherein a first clock signal is associated with the first region, a second clock signal is associated with the second region, and a third clock signal is associated with the third region; wherein the second clock signal and the third clock signal are disabled when the second region and the third region are not storing data; wherein the second clock signal is enabled in response to receiving a carry over command from the first region; and wherein the third clock signal is enabled in response to receiving a carry over command from the second region.

Figure 3:
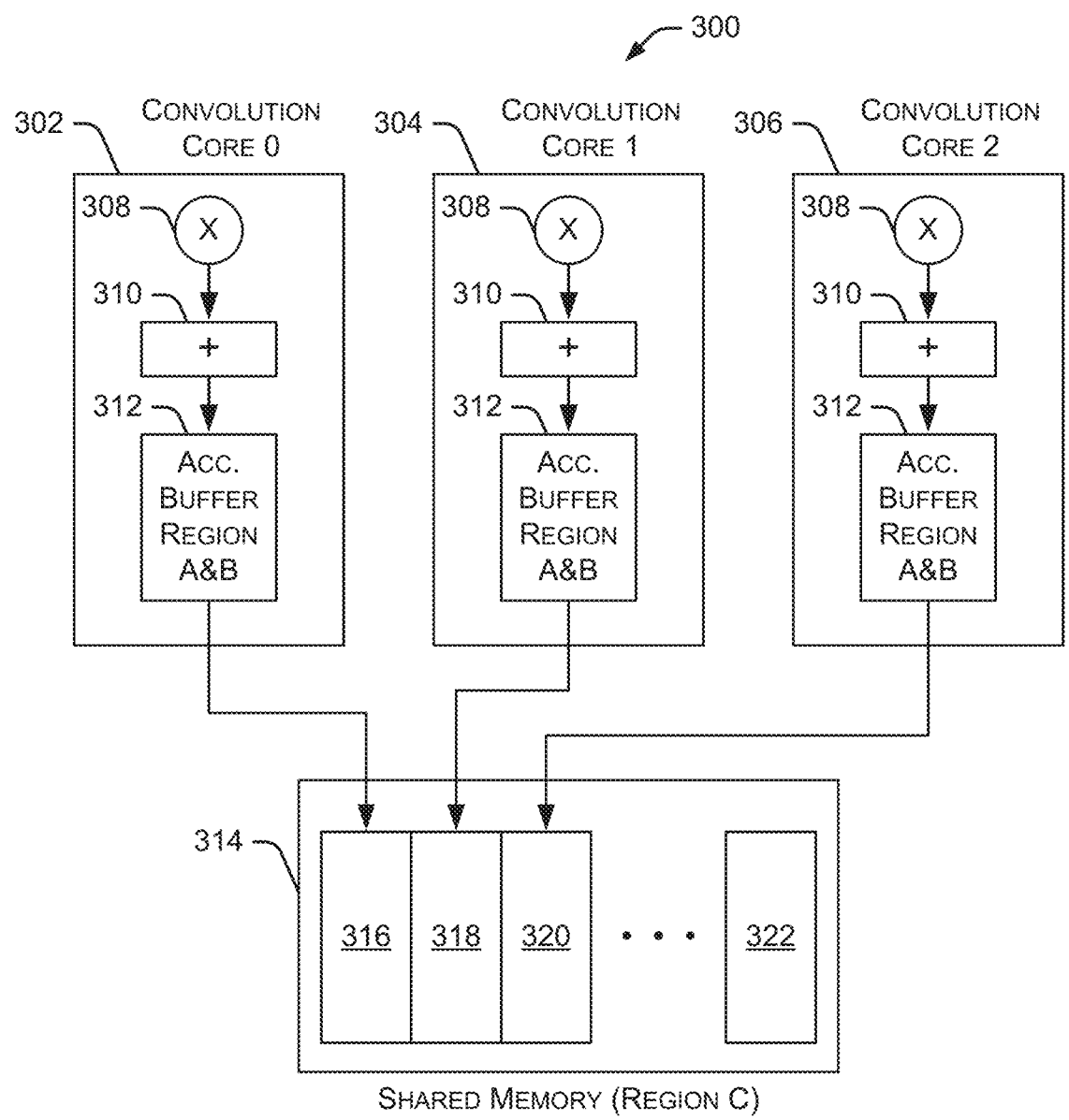
FIG. 3 illustrates an embodiment of a series of convolution cores and associated shared memory.

FIG. 3 illustrates an embodiment of a series 300 of convolution cores and associated shared memory. In the example of FIG. 3, three convolution cores are shown: a first convolution core 302, a second convolution core 304, and a third convolution core 306. In particular implementations, any number of convolution cores may be used with the systems and methods discussed herein. Each convolution core 302, 304, 306 includes a multiplier 308, an adder 310, and an accumulation buffer 312. In some embodiments, each convolution core 302, 304, 306 is coupled to a shared memory 314. As shown in FIG. 3, shared memory 314 may include any number of memory segments (or memory portions) 316, 318, 320, and 322 for storing various types of data. In some embodiments, each memory segment 316, 318, 320, and 322 is associated with one of the convolution cores 302, 304, 306.

In some embodiments, accumulation buffer 312 contains regions A and B as discussed herein with respect to FIG. 2. Thus, the data associated with regions A and B is stored within each convolution core 302, 304, 306 to allow fast access to that data. In some embodiments, the data associated with region C is stored in shared memory 314, which may be external to each convolution core 302, 304, 306. In the example of FIG. 3, the most commonly used data is likely to be stored in regions A and B within each convolution core 302, 304, 306. The region C data, which may be used less frequently, is stored in the separate shared memory 314. In some embodiments, this configuration of regions A, B, and C reduces the amount of memory required within each convolution core 302, 304, 306. This reduction in memory size reduces the size of the silicon on which convolution cores 302, 304, 306 are implemented. In some embodiments, this reduction in silicon size may reduce power consumption of the systems and methods described herein.

In the example of FIG. 3, shared memory 314 is updated when accumulation buffer 312 has a carry over to region C (similar to carry over 210 discussed with respect to FIG. 2). In some embodiments, a carry over to region C does not occur frequently, so shared memory 314 may not be a high performance memory component.

In some implementations, a FIFO (first-in, first-out) buffer (not shown) may be located between each convolution core 302, 304, 306 and shared memory 314. The FIFO buffer receives data storage requests sent to shared memory 314 and buffers those requests for processing in sequential order.

In other embodiments, instead of a FIFO buffer, the systems and methods may use a sequencer (not shown) executing in accumulation buffer 312 of each convolution core 302, 304, 306. The sequencer may provide a particular time period (e.g., time slot) to each convolution core 302, 304, 306 during which the convolution core can output a carry over signal to shared memory 314. Since each convolution core 302, 304, 306 sends a carry over signal at different times, a FIFO buffer is not needed. In some embodiments, data storage requests and other data is sent from each convolution core 302, 304, 306 to shared memory 314 during the convolution core's designated time period, as managed by the sequencer.

Although FIG. 3 illustrates an example environment using multiple convolution cores 302, 304, 306, similar systems and methods may be used with other types of hardware and software processing structures and systems. In some embodiments, convolution cores 302, 304, 306 may be similar to the convolution core shown in FIG. 1.

Figure 4:
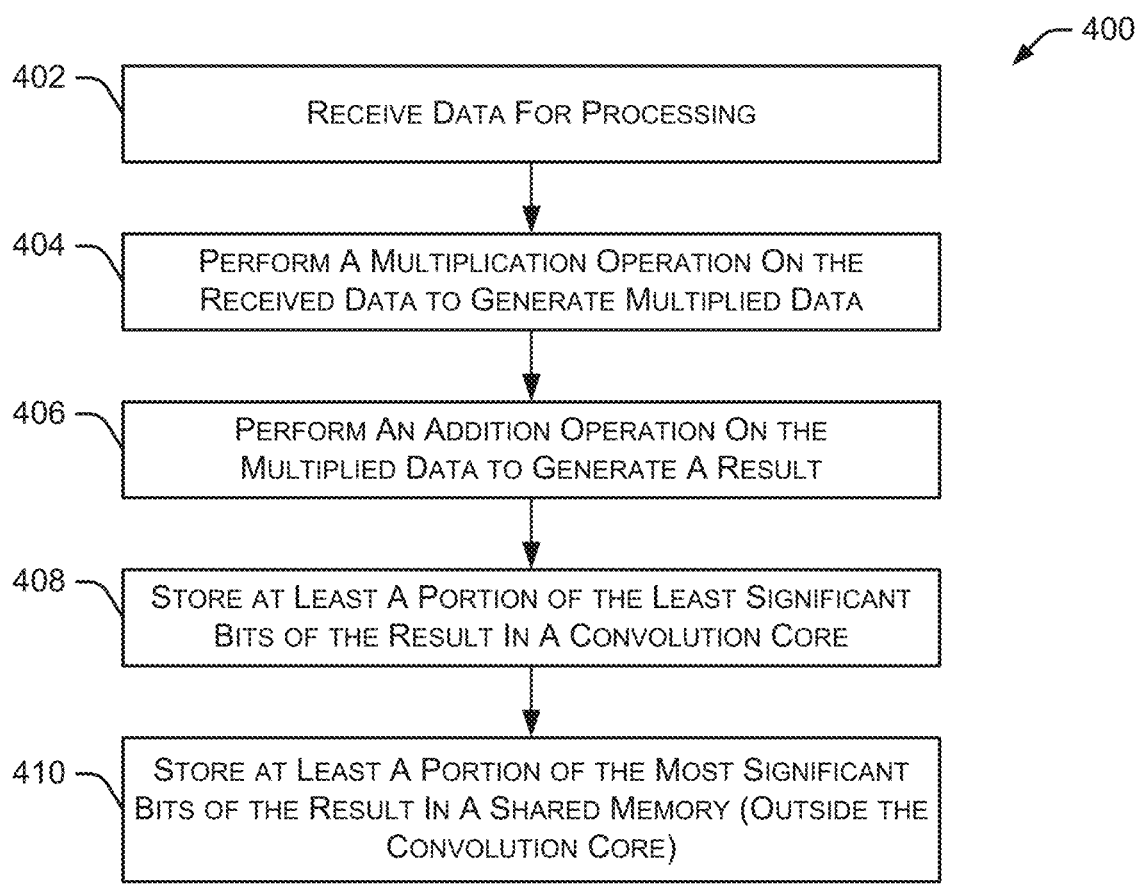
FIG. 4 is a flow diagram illustrating an embodiment of a method for performing multiply/accumulate operations.

FIG. 4 is a flow diagram illustrating an embodiment of a method 400 for performing multiply/accumulate operations. Initially, method 400 receives 402 data (or a data processing request). The method performs 404 a multiplication operation on the received data to generate multiplied data. Method 400 then performs 406 an addition operation on the multiplied data to generate a result. At least a portion of the least significant bits of the result are stored 408 in a convolution core. The method also stores 410 at least a portion of the most significant bits of the result in a shared memory located outside the convolution core. In some embodiments, storing 410 at least a portion of the most significant bits of the result in a shared memory located outside the convolution core is performed in response to determining that the accumulation buffer of the convolution core generated a carry over command.

The example of FIG. 4 is discussed with respect to one or more convolution cores. In other embodiments, method 400 may be used with any type of hardware, software, processing structures, data processing systems, and the like.

Figure 5:
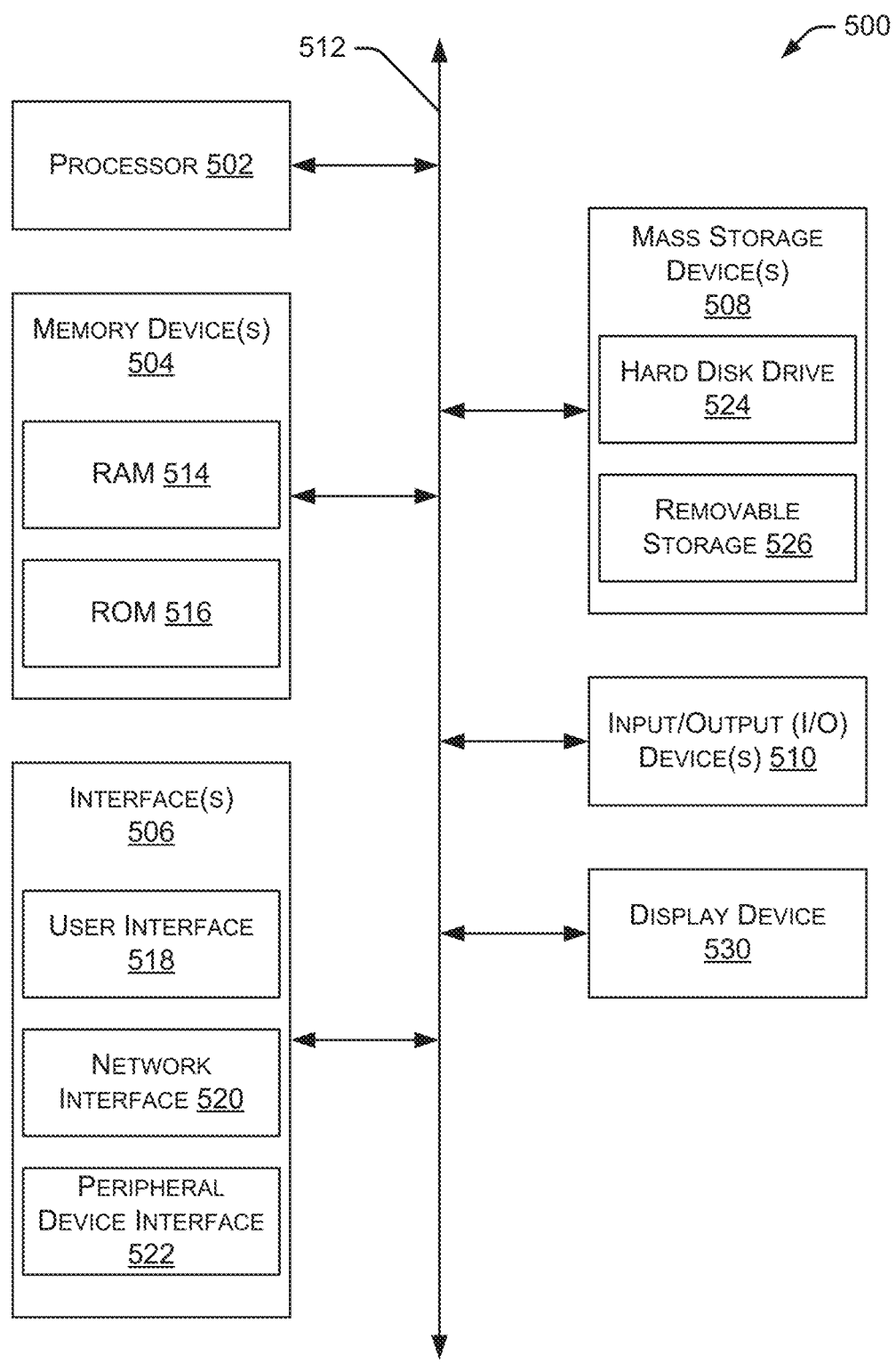
FIG. 5 illustrates an example block diagram of a computing device.

FIG. 5 illustrates an example block diagram of a computing device 500. Computing device 500 may be used to perform various procedures, such as those discussed herein. For example, computing device 500 may perform any of the functions or methods of the computing devices and systems discussed herein. Computing device 500 can perform various functions as discussed herein, and can execute one or more application programs, such as the application programs or functionality described herein. Computing device 500 can be any of a wide variety of computing devices, such as a desktop computer, a notebook computer, a server computer, a handheld computer, tablet computer, a wearable device, and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 may include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s)

506 may also include one or more peripheral interfaces such as interfaces for printers, pointing devices (mice, track pad, or any suitable user interface now known to those of ordinary skill in the field, or later discovered), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
   a first region configured to store data associated with at least a portion of least significant bits of a computational result;
   a second region configured to store data associated with at least a portion of most significant bits of the computational result; and
   a third region configured to store data associated with at least a portion of bits of the computational result having a significance between the least significant bits and the most significant bits of the computational result;
   wherein a first clock signal is associated with the first region, a second clock signal is associated with the second region, and a third clock signal is associated with the third region;
   wherein the second clock signal and the third clock signal are disabled when the second region and the third region are not storing data;
   wherein the second clock signal is enabled in response to receiving a carry over command from the first region; and
   wherein the third clock signal is enabled in response to receiving a carry over command from the second region.

* * * * *